United States Patent [19]

Belcher

[11] 4,228,658
[45] Oct. 21, 1980

[54] METHOD AND APPARATUS FOR CONVERTING PRESSURE INTO ROTATIVE MOTION

[76] Inventor: Alan E. Belcher, 7 Lakeside Dr., Andover, Conn. 06232

[21] Appl. No.: 898,703

[22] Filed: Apr. 24, 1978

[30] Foreign Application Priority Data

Apr. 29, 1977 [GB] United Kingdom ............... 17975/77

[51] Int. Cl.³ ............................................ F01K 25/06
[52] U.S. Cl. ...................................... 60/649; 60/531; 60/669; 415/75
[58] Field of Search ................ 60/508, 514, 516, 530, 60/531, 643, 645, 649, 671, 651, 673, 675, 674, 669; 415/73, 88, 75; 417/94

[56] References Cited

U.S. PATENT DOCUMENTS

| 666,637 | 1/1901 | Beck | 60/514 |
| 984,579 | 2/1911 | Marti | 60/516 X |
| 1,395,267 | 11/1921 | Fisher | 415/73 |
| 3,982,378 | 9/1976 | Sohre | 60/721 X |

FOREIGN PATENT DOCUMENTS 155005 12/1920 United Kingdom ............... 60/531
1427723 3/1976 United Kingdom .

Primary Examiner—Allen M. Ostrager
Assistant Examiner—Stephen F. Husar
Attorney, Agent, or Firm—McCormick, Paulding & Huber

[57] ABSTRACT

A fluid engine comprising a coiled conduit having a fluid inlet and a fluid outlet and supported to rotate about its axis in a partially immersed condition within a first fluid which interfaces with a second fluid having a different fluid density. Rotation of the conduit about its axis causes the fluid inlet to alternately be immersed in the first and second fluids whereby a quantity of each fluid is entrapped within each convolution of the conduit resulting in an unbalanced fluid condition producing a gravitational turning moment. Pressure differential across the coiled conduit between the inlet and the outlet maintains fluid flow through the conduit from the inlet to the outlet thereby sustaining the unbalanced condition which causes conduit rotation. The required differential may be provided by a head of water or may be created by evaporating a liquid or by thermally expanding a gas.

23 Claims, 6 Drawing Figures

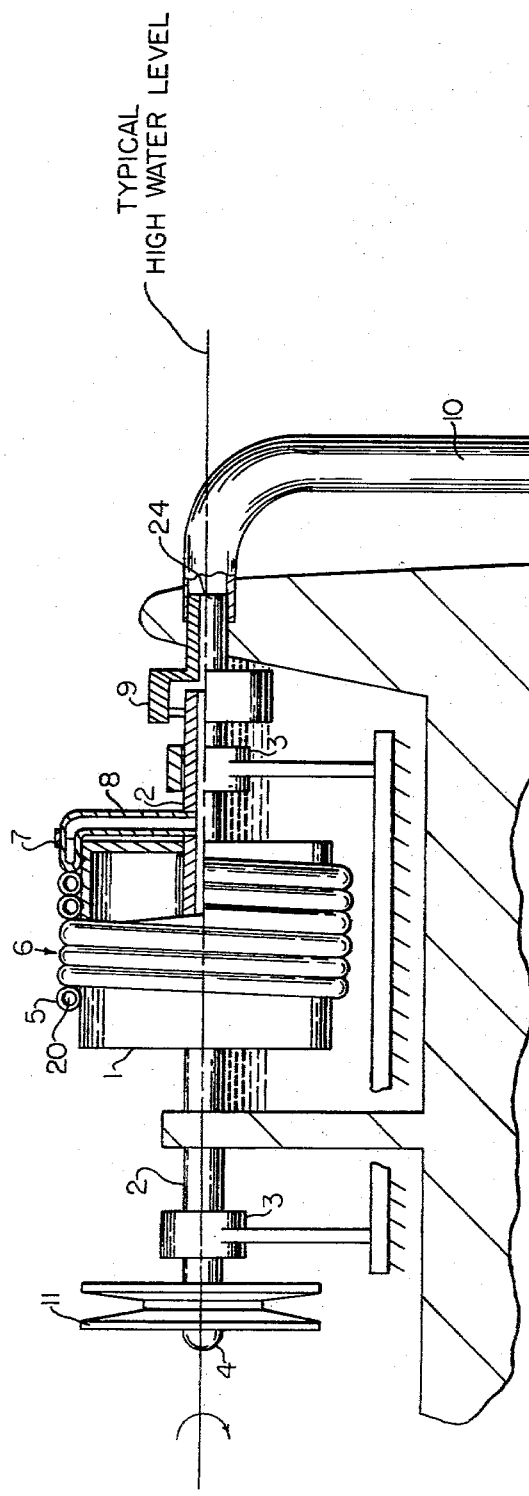
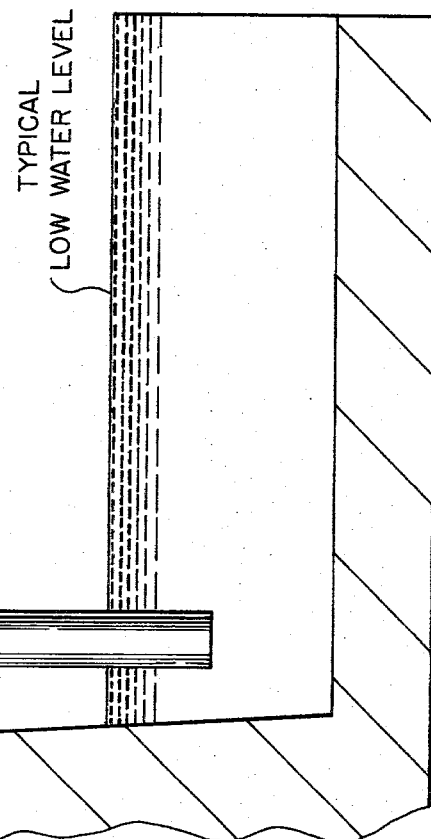
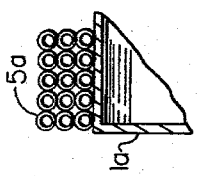
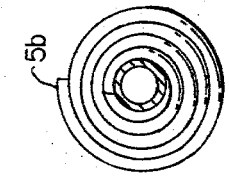

METHOD AND APPARATUS FOR CONVERTING PRESSURE INTO ROTATIVE MOTION

This invention relates to a method and apparatus for converting a pressure in a fluid into rotative motion.

The invention provides a method of converting pressure into rotative motion comprising continually forming U-tube manometers during the conversion operation to replace U-tube manometers being continually destroyed during said conversion operation to maintain in existence a series of interconnected U-tube manometers capable of opposing a pressure of fluid.

The invention also provides an apparatus comprising a coiled conduit having a fluid inlet and a fluid outlet, and means to allow the coil to rotate freely about its axis with the fluid inlet partially immersed in a first fluid having an interface with a second fluid to cause said inlet alternately to be immersed in first and second fluids whereby a series of interconnected U-tube manometers are continually formed and advanced along said coil to form a liquid seal capable of opposing a pressure dependent on the diameter and number of turns of the coil.

In the present specification the term "coil" also includes spiral or helix.

The invention relies for its action upon the laws of hydrostatics governing the behavior of fluids of dissimilar specific density contained within several enclosed and communicating vessels and upon the principle that the sum of the hydrostatic columns of two or more serially connected U-tube manometers will equal a single opposing hydrostatic column when equilibrium is achieved. In particular the invention relies upon the principle that the mass of fluid displaced by a hydrostatic column within an annular U-tube manometer pivoted freely at its center will develop a turning moment about said pivot directly proportional to the hydrostatic column applied, said turning moment being independent of the quantity of fluid contained within said U-tube manometer or within several serially interconnected U-tube manometers.

In the drawings:

FIG. 1 is a somewhat schematic side elevational view of a fluid engine embodying the present invention and shown partially in axially section.

FIG. 2 is a somewhat schematic fragmentary side elevational view of another fluid engine embodying the present invention and shown partially in axial section.

FIG. 3 is a sectional view taken generally along the line 3—3 of FIG. 2.

FIG. 4 is a fragmentary axial sectional view of still another fluid engine embodying the invention.

Figure 6:
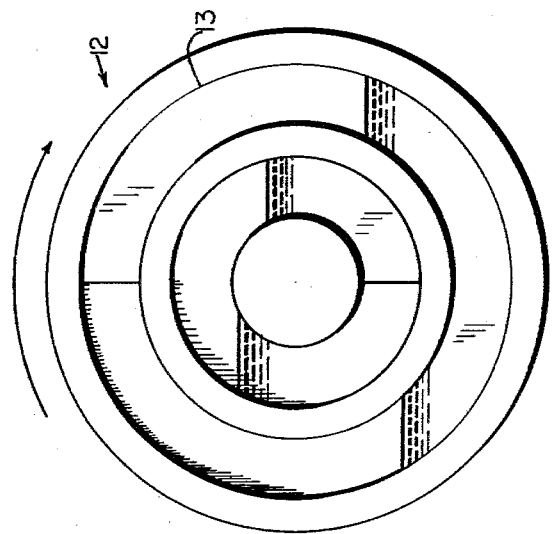
FIG. 6 is a sectional view taken along the line 6—6 of FIG. 5.

The invention will now be described, by way of example, with reference to the drawings. Referring first to FIG. 1, which shows a part sectional view of a rotative engine according to the invention, a hollow cylindrically shaped structure 1 is rigidly attached to a hollow supporting shaft or axle 2 coincidental with the axis of said cylindrical structure 1. Said supporting shaft 2 is located horizontally in two supporting bearings 3 in such a manner that both ends of said shaft 2 protrude substantially beyond said bearings 3 and so that both the hollow shaft 2 and the cylindrical structure 1 may freely rotate about a horizontal axis. One end of the hollow shaft 2 is hermetically sealed as shown at 4.

A pipe or tube 5 of constant cross-section is disposed around the periphery of the cylindrical structure 1 in a number of turns so as to form a cylindrically shaped coil 6 and is rigidly attached to said cylindrical structure 1. Said tube 5 can be of any bore or internal dimension greater than that which would have a capillary effect upon the fluid passing through said tube.

One end of the coiled pipe 5 is hermetically connected at 7 to the hollow shaft 2 via a tube or pipe 8 radially disposed at right angles to and hermetically connected to said hollow shaft 2 and adjacent to one end of the cylindrical structure 1. The other end of said coiled pipe 5 terminates at the periphery of the cylindrical structure 1 at a circumferentially disposed fluid inlet 20 which is open to atmosphere. A continuous and unobstructed passage is therefore formed from the open end of the coiled pipe 5, through said coiled pipe 5, via the radial pipe 8 and through a fluid outlet 22, disposed generally axially of the coil and into the hollow shaft 2, to a rotary seal 9, beyond which the discharge pipe 10 is attached. The discharge pipe 10 terminates at a point substantially below the level of the engine.

Suitable means for transmitting the rotative power developed, e.g. a pulley wheel 11 is rigidly attached to the closed end of the hollow shaft 2, i.e. the end opposite the rotary seal 9.

It should be noted that the rotary seal 9 can be dispensed with in those cases where the discharge pipe 10 can be allowed to rotate together with the hollow shaft 2.

The engine operates as follows:

In the following description the two fluids passing through the engine are taken for example to be water and air, but it is envisaged that satisfactory operation of the engine is not restricted to these two particular fluids.

The engine is immersed in a quantity of water until the cylindrical structure 1 and coil 6 are submerged to a depth approximating the radius of said cylindrical structure 1 and so that the hollow shaft 2 is maintained in a substantially horizontal position.

The cylindrical structure 1 is then made to rotate by some external means in a direction whereby a trace along the coiled pipe 5 would progress from the open end thereof towards the end connected at 7 to the radial pipe 8.

For approximately half of each revolution, the open end of the coiled pipe 5 will be submerged in the water, while for the remainder of each revolution, the open end will rise above the level of the water.

During that part of each revolution that the open end of coiled pipe 5 is submerged, water will flow into said coiled pipe 5 by virtue of the hydrostatic head of the water. As the open end emerges and rises above the level of the water, the water which has entered the coiled pipe 5 through the open end will be retained within said coiled pipe 5. Moreover, as the coiled pipe 5 continues to be rotated the water so retained within the coiled pipe 5 will move along same by virtue of the screw action of said coiled pipe 5 and because the retained water will seek hydrostatic equilibrium within the lower half of each turn of the coiled pipe 5.

As the water proceeds along the coiled pipe 5 in the manner described above, air will be drawn into said coiled pipe 5 for as long as the open end of the pipe 5 is above the level of the water.

The cycle of events described above is repeated for each revolution of the cylindrical structure 1 and coiled pipe 5.

Assuming that the engine was being rotated by some external means, as would be the case during the initial priming stage of operation, the water trapped in each lower-half turn of the coiled pipe 5 would seek a true level, which is to say that both ends of each segment of water retained within the coiled pipe 5 would be at the same height.

If the coiled pipe 5 is considered in the state described in the preceding paragraph, i.e. approximately half full of water, it will be realized that each turn of the coiled pipe 5, and the water retained within the lower half of that turn, constitutes a U-tube manometer, and that the several turns of the coiled pipe 5 constitute a corresponding number of serially interconnected U-tube manometers. It follows that if a pressure differential were created across the coiled pipe 5, the retained water within each turn of the coiled pipe 5 would be displaced up the vertical part of that turn, away from the source of positive pressure, until the addition of the hydrostatic column built up in each turn of the coiled pipe 5 equals and opposes the pressure differential applied. Therefore, as the cylindrical structure 1 and the coiled pipe 5 continue to be rotated, the water contained within the coiled pipe 5 is forced into and along the hollow shaft 2 and into the discharge pipe or siphon 10 via the rotary seal 9.

As the water descends down the discharge pipe 10 under the effect of gravity a substantial negative pressure is created at the fluid outlet 7 of the coiled pipe 5. The water retained within the coiled pipe 5 is therefore displaced away from the inlet of the coiled pipe 5 which is open to the atmosphere and is therefore at a pressure higher than at the outlet 7 of the coiled pipe 5. The mass of water so displaced within the coiled pipe 5 creates a turning moment under the effect of gravity causing the cylindrical structure 1, the coiled pipe 5, and the hollow shaft 2 to rotate continuously in the same direction as said coiled pipe 5 was initially rotated by an external means during the priming operation.

It will be evident that the discharge will not consist of water alone but will include approximately equal amounts of air. Since the pressure differential developed across the coiled pipe 5 is solely dependent upon the mass of water descending down the discharge pipe 10 it follows that that portion of the discharge comprising air will have no effect upon the creation of said differential pressure.

The following variations in the above described exemplimentary design of the rotative engine are envisaged at this stage:

The coiled pipe may be so constructed as to be self supporting to eliminate the need for a separate supporting structure. It may also comprise several layers of banks of windings, as shown in FIG. 4, wherein a coiled pipe, indicated at 5a, comprises several layers or banks wound on a generally cylindrical support structure 1a.

Any hermetic conduit following the form of a coil could be constructed integrally with the supporting structure.

The pipe or conduit may also be formed in the form of a scroll instead of cylindrical form providing the cross-section of same is progressively varied so as to maintain a constant volume per degree of arc. A typical fluid engine which has a pipe 5b of scroll form is illustrated in FIGS. 2 and 3.

Both intake and discharge from the coiled pipe may be effected by annular or circular chambers situated at either end of the coiled pipe. Intake to the coiled pipe may be effected from other pipes or vessels and need not be at atmospheric pressure.

The volume per degree of arc of the coiled pipe should remain substantially constant. Changes in radius must therefore be compensated for by a corresponding change in the cross section of the pipe. Therefore, if a coiled pipe is wound in two or more layers or banks, each successive layer proceeding outwardly from the center should have a smaller cross-sectional area than the preceding layer so that any section of pipe enclosed in a given sector will be of equal volume regardless of its distance from the center of the coil.

In the case of a scroll or spiral configuration, the cross-sectional area of the pipe or conduit would have to be reduced progressively as the radius of the scroll increases.

It is an advantage of the present invention that it provides a relatively inexpensive and simple means for converting a pressure into rotative power. The engine essentially involves a single moving assembly and does not make use of pistons, valves or other occlusive devices. The rotary seal is incorporated for purely practical purposes and in no way is this device essential to the performance of the engine.

The invention is essentially a low speed machine and may be capable of operating at any rotational speed up to the point where fluid flow friction becomes so great as to impede the formation of the hydrostatic columns within the engine.

Because the engine is essentially a low speed machine and because it is similar in every respect to the manometric pump from which it derives, the two devices can be coupled together mechanically to form a hydraulic transformer whereby the volume/pressure ratio present in a flow of fluid could be converted to any other ratio with minimal loss of energy. In addition the nature of the driving fluid could be different from the output fluid.

Many uses are envisaged but principally it would find use as an inexpensive substitute for water wheels and low-head water turbines.

The pressure differential across the coiled pipe need not necessarily have to be created by a head of water. The required pressure could be created equally well by thermally evaporating a liquid, as in the Rankine cycle, or by the thermal expansion of a gas, as in the Stirling cycle. In either case the engine would require the addition of a compressor stage, which could be a manometric pump forming an integral part of the engine. Such a pump comprises a coiled conduit which has a fluid inlet and a fluid outlet, and means for rotating the conduit about its axis with the conduit partially immersed in a first fluid which has an interface with a second fluid to cause the inlet alternatively to be immersed in said first and second fluids whereby a series of interconnected U-tube manometers are continually formed and advanced along said coil to pump the fluids to a head dependent on the diameter and number of turns of the coil.

Figure 5:
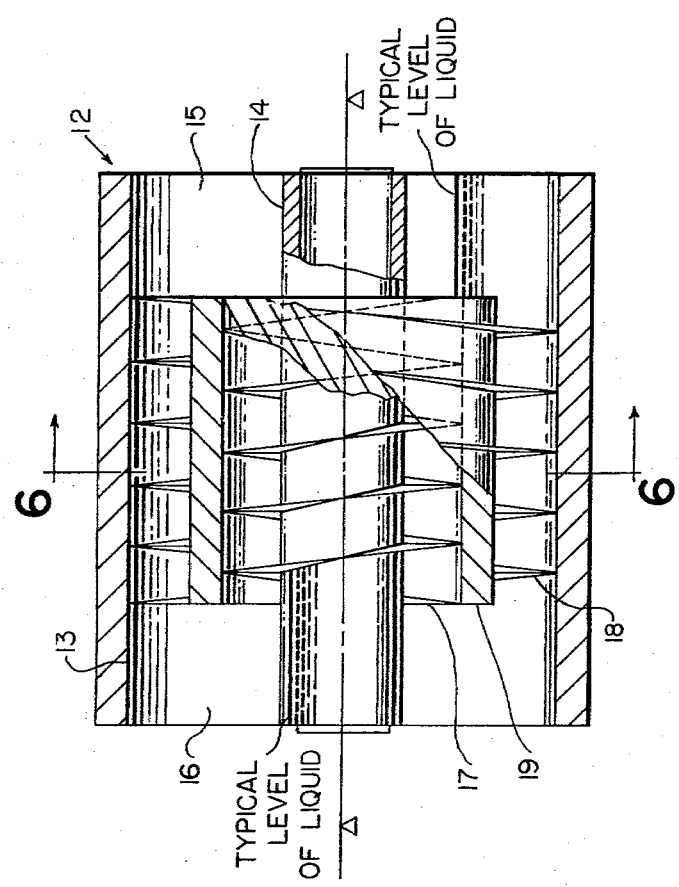
FIG. 5 is a somewhat schematic axial sectional view of yet another fluid engine embodying the invention.

In FIGS. 5 and 6 there is shown a typical fluid engine, indicated generally at 12, wherein the required fluid pressure differential for operation is obtained by either thermally evaporating a liquid or thermally expanding a gas. The illustrated engine 12 has a cylindrically drum-shaped housing 13 which is closed at its opposite ends by end walls. A hollow cylindrical supporting structure 14 extends through the housing between the end walls coincidental with the housing axis. An evaporating chamber 15 and a condensing chamber 16 are located within the housing at axially opposite ends thereof.

Two coiled conduits mounted in fixed position within the housing define fluid flow paths between the chambers 15 and 16. The form of the coiled conduits and the arrangement of these conduits within the housing may vary, however, in the illustrated embodiment the conduits are of helical form and include a compressor helix 17 and a power helix 18. The compressor helix 17 is wound around the cylindrical support member 14 and contained within a tubular support member 19. The power helix 18 is wound on the support member 19 and extends between the latter member and the associated inner peripheral surface of the drum-shaped housing 13. Preferably, each convolution of the compressor helix 16 has an annular volume equal to about one-half of the annular volume of a corresponding convolution of the power helix. The compressor helix essentially comprises a manometric pump as hereinbefore described.

The illustrated engine 12 is adapted for clockwise rotation, as viewed in FIG. 6, therefore, the compressor helix 17 has a right hand twist whereas the power helix 18 is formed with a lefthand twist. The inlet end of the power helix 18 communicates with the evaporating chamber 15 at the high pressure end of the engine whereas the outlet end of the power helix communicates with the condensing chamber 16 at the low pressure of the engine. The inlet end of the compressor helix 17 is located at the low pressure end of the engine and its outlet end is located at the high pressure of the engine. Thus, the evaporating chamber 15 provides fluid communication between the outlet end of the compressor helix 17 and the inlet end of the power helix 18. Conversely, the condensing chamber at 16 provides fluid communication between the outlet end of the power helix 18 and the inlet end of the compressor helix 17.

Various fluids may be used to operate the engine. It may, for example, be operated using water as a driving fluid, as in the Rankine cycle, when a suitable heat source is available, however, where temperature gradient is minimal a flurocarbon or hydrocarbon should prove particularly suitable for use as a driving fluid. The illustrated engine 12 preferably utilizes Freon as an operating fluid. Since the compressor stage is contained within the engine housing, the driving fluid is sealed within the housing, however, it will be apparent to those skilled in the art that the compressor stage could be located externally of the engine housing, and coupled thereto, and such modified engine forms are contemplated within the scope of the invention.

Various means may be provided for supporting the engine housing 13 for rotation about its axis and in FIG. 5 journals for this purpose are schematically illustrated. The engine 12 is particularly suited to float on a body of water whereby it is supported for rotation about its axis. When the engine is operated in a floating condition suitable journals may be provided to maintain it in a desired location.

Preparatory to operation the engine 12 is primed by rotating it in its normal operating direction for as long as may be necessary to stablize the driving fluid. Heat from a suitable external source as, for example, solar heat, applied to the high pressure end of the engine causes the Freon to thermally expand thereby increasing the pressure of the gas within the evaporating chamber 15. As the housing 13 rotates the inlet end of the power helix 18 is alternately emersed within interfaced liquid and gas contained within the evaporating chamber. The liquid, being denser than the gas, seeks equilibrium within the lower portion of each convolution of power helix. Since the pressure in the evaporating chamber 15 is substantially greater the pressure in the condensing chamber 16 at the outlet end of the power helix an unbalanced fluid condition is attained within power helix, thereby, producing a gravitational turning moment. The engine begins to operate when this unbalanced fluid condition is attained and continues to operate for as long as this unbalanced fluid condition is maintained.

The compressor helix 18 pumps Freon from the condensing chamber 16 back to the evaporating chamber 15. It will be apparent that a counterproductive unbalanced fluid condition will also occur within the compressor helix 17 and will be maintained for as long as the engine remains in operation. As stated previously, the turning moment is not dependent on the quantity of liquid displaced but on the total volumetric throughput. The useful power obtained from such an arrangement will be that remaining after subtracting the power absorbed by the compressor from the gross power developed by the engine.

The engine hereinbefore described and variants thereof demand little precision in construction and can be built with elementary tools and expertise. This advantage together with the inherent simplicity of the low cost make such engines ideal for nonindustrials who could build and maintain such engines of up to many thousands of shaft horsepower.

I claim:

1. A fluid engine comprising at least one coiled conduit having a fluid inlet and a fluid outlet, means supporting said conduit for rotation in one direction about its axis and in a partially immersed condition within a first fluid having an interface with a second fluid of a different fluid density than said first fluid to alternately immerse said fluid inlet in said first and second fluids, and means for maintaining the pressure of the fluid at said fluid outlet below the pressure of the fluid at said inlet whereby to maintain an unbalanced fluid condition within said conduit resulting in a gravitational turning moment about said axis.

2. A fluid engine as set forth in claim 1 wherein said conduit comprises a helically wound coil and said fluid inlet is disposed circumferentially of said coil and said fluid outlet is disposed generally axially of said coil.

3. A fluid engine as set forth in claim 2 wherein said coil is supported on a cylindrical structure mounted on a hollow shaft.

4. A fluid engine as set forth in claim 3 wherein a terminal end of said coil communicates with the interior of said hollow shaft to form said fluid outlet.

5. A fluid engine as set forth in any of claims 2 to 4 wherein said coil comprises two or more banks or layers.

6. A fluid engine as set forth in any one of claims 1 through 4 wherein said pressure maintaining means comprises means for continuously maintaining the pressure of the fluid at said fluid outlet below the pressure of the fluid at said fluid inlet.

7. A fluid engine as set forth in claim 1 wherein said conduit comprises a spirally wound conduit in the form of a scroll.

8. A fluid engine as set forth in claim 1 wherein said means for maintaining the pressure of said fluid comprises a siphon.

9. A fluid engine as set forth in claim 1 wherein said engine includes another coiled conduit having a fluid inlet and a fluid outlet, first means providing fluid communication between the fluid inlet of said one conduit and the fluid outlet of said other conduit, and second means providing fluid communication between the fluid outlet of said one coiled conduit and the fluid inlet of said other coiled conduit.

10. A fluid engine as set forth in claim 9 wherein said first means comprises means defining an evaporation chamber and said second means comprises means defining a condensing chamber.

11. A fluid engine as set forth in either claim 9 or claim 10 wherein said one coiled conduit and said other coiled conduit are coaxially aligned.

12. A fluid engine as set forth in claim 9 wherein a single convolution of one of the conduits comprising said one and said other conduit has an annular volume equal to approximately one half of the annular volume of a single convolution of the other of said conduits.

13. A fluid engine as set forth in claim 1 wherein one of the fluids comprising said first and second fluid is normally in a gaseous state and the other of said fluids is normally in a liquid state.

14. A fluid engine comprising a housing having evaporation and condensing chambers therein, means defining at least two coiled conduits disposed in fixed position within said housing for defining at least two separate flow paths between said chambers, one of said conduits having a fluid inlet in fluid communication with said evaporating chamber and a fluid outlet in fluid communication with said condensing chamber, the other of said conduits having a fluid inlet in fluid communication with said condensing chamber and a fluid outlet in fluid communication with said evaporating chamber, means supporting said housing for rotation about an axis and and quantities of two different fluids contained within said housing, said two different fluids being of different specific densities and in interfaced relation to each other.

15. A fluid engine as set forth in claim 14 wherein said housing comprises a cylindrical container, said evaporating and said condensing chambers are located at axially opposite ends of said container, and said coiled conduits are supported within said container between said chambers.

16. A fluid engine as set forth in claim 15 wherein said two coiled conduits comprise helical conduits of opposite hand.

17. A fluid engine as set forth in either claim 15 or 16 wherein said helical conduits are coaxially supported within said cylindrical container.

18. A fluid engine as set forth in either claim 15 or 16 wherein a single convolution of one of said helical conduits has a volume equal to approximately to one half of the volume of a single convolution of the other of the said helical conduits.

19. A fluid engine as set forth in claim 14 wherein one of said fluids is a gas and the other of said fluids is a liquid.

20. A method for converting pressure into rotary motion comprising the steps of rotating a coiled conduit in one direction about its axis and in a partially immersed condition within a first fluid having an interface with a second fluid and a different fluid density than said second fluid to alternately immerse a fluid inlet of said coiled conduit in said first and second fluids whereby to start said rotary motion, and maintaining the fluid pressure at an outlet of said coiled conduit below the fluid pressure within said coiled conduit whereby to maintain an unbalanced fluid condition within said conduit resulting in a turning moment about said axis.

21. A method for converting pressure into rotary motion as set forth in claim 20 wherein the step of maintaining the fluid pressure at said outlet is further characterized as siphoning fluid from said outlet.

22. A method for converting pressure to rotary motion as set forth in either claim 20 or claim 21 wherein the step of maintaining the fluid pressure is further characterized as continuously maintaining the fluid pressure at an outlet of said coil conduit below the fluid pressure within said coiled conduit whereby to maintain a constant unbalanced fluid condition within said conduit.

23. A method for converting pressure to rotary motion as set forth in claim 20 wherein the step of maintaining the fluid pressure at the outlet end is further characterized as adding heat to the fluid at the inlet end of the conduit and removing heat from the fluid at the outlet end of the conduit.

* * * * *